June 10, 1930. G. W. KRETZSCHMAR 1,762,722
APPARATUS FOR USE IN THE MANUFACTURE OF LAMINATED GLASS
Filed Aug. 28, 1928 2 Sheets-Sheet 1

INVENTOR
George W. Kretzschmar
BY
Redding, Greeley, O'Shea & Campbell
ATTORNEYS

June 10, 1930.   G. W. KRETZSCHMAR   1,762,722
APPARATUS FOR USE IN THE MANUFACTURE OF LAMINATED GLASS
Filed Aug. 28, 1928   2 Sheets-Sheet 2

Patented June 10, 1930

1,762,722

UNITED STATES PATENT OFFICE

GEORGE W. KRETZSCHMAR, OF GARFIELD, NEW JERSEY, ASSIGNOR TO TRIPLEX SAFETY GLASS COMPANY OF NORTH AMERICA, OF NEW YORK, N. Y., A CORPORATION OF DELAWARE

APPARATUS FOR USE IN THE MANUFACTURE OF LAMINATED GLASS

Application filed August 28, 1928. Serial No. 302,476.

In the manufacture of laminated glass, in which a sheet of celluloid or other non-frangible material is placed between two sheets of glass, with such firm adhesion that if the glass is broken by a blow the splinters of glass will not leave the interposed sheet of celluloid or like material, it has been found desirable to seal the edges of the glass so that the celluloid shall be protected against the penetration of air or gases or moisture. Such sealing is best accomplished by filling with a suitable sealing compound a thin space left at the edge of the sheet of laminated glass by removal or omission of the celluloid from a narrow strip between the sheets of glass. By reason of the methods followed in the preparation and assembling of the glass and celluloid and the thinness of the space left between the two sheets of glass at the edge, the proper cleaning out of the thin space left at the edge, preparatory to the introduction of the sealing compound, has been a matter of much difficulty and has required hitherto an amount of manual labor which represents a substantial element in the cost of production of the completed article. It has been the object of this invention to provide means whereby the cleaning out of this narrow space between the two sheets of glass can be effected thoroughly and quickly and in the development of the invention it has been found that the desired result can be accomplished by the use of a thin, endless band scraper which is properly supported and operated and to which the laminated sheet of glass can be presented for action by the endless band scraper.

The invention will be more fully explained hereinafter with reference to the accompanying drawings in which it is illustrated as embodied in the suitable form of apparatus and in which.

The apparatus illustrated has a suitable supporting frame $a$ on which is mounted, so as to be capable of being moved toward and from the scraper hereinafter mentioned, a glass supporting table $b$ which is preferably provided with a rubber pad $b^1$ on which the sheet of laminated glass may rest, and, at its forward edge, with stops $b^2$ to limit the forward movement of the sheet of glass. As a convenient means for effecting the gradual forward movement of the glass toward the scraper the table $b$ is shown as provided near its ends with racks $c$, which are engaged by gears $d$ on a shaft $d^1$ suitably mounted in the frame of the machine and provided, as at $d^2$, with an operating handle. In order that the glass may be held firmly on the table without danger of breakage there is provided a presser $e$ which has a contact foot $e^1$ and is supported by arms $e^2$ of a shaft $e^3$. The presser is conveniently operated through connection of an arm $e^4$ on the shaft $e^3$ to the piston rod $f$ of a double acting presser cylinder $f^1$, conveniently controlled by a three-way valve $f^2$, air under pressure being supplied through a pipe $f^4$ from any convenient source.

Figure 1:
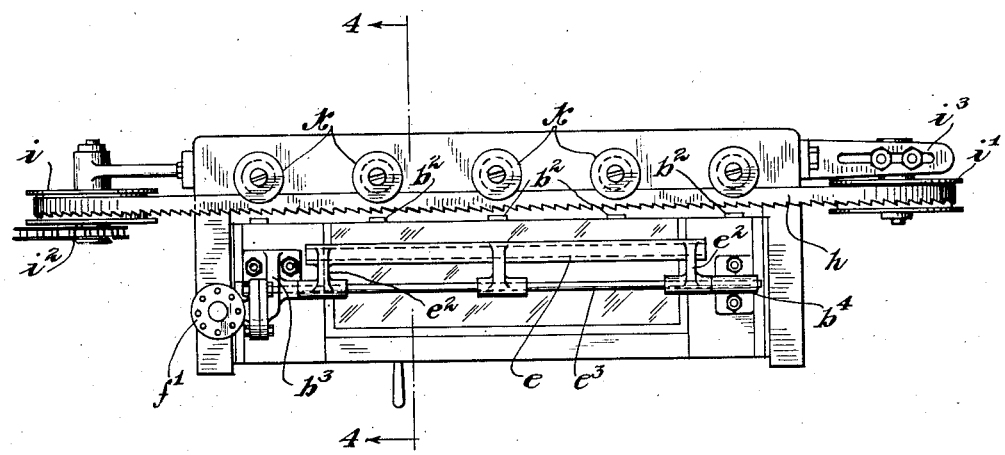
Figure 1 is a top view of such an apparatus.
Figure 2:
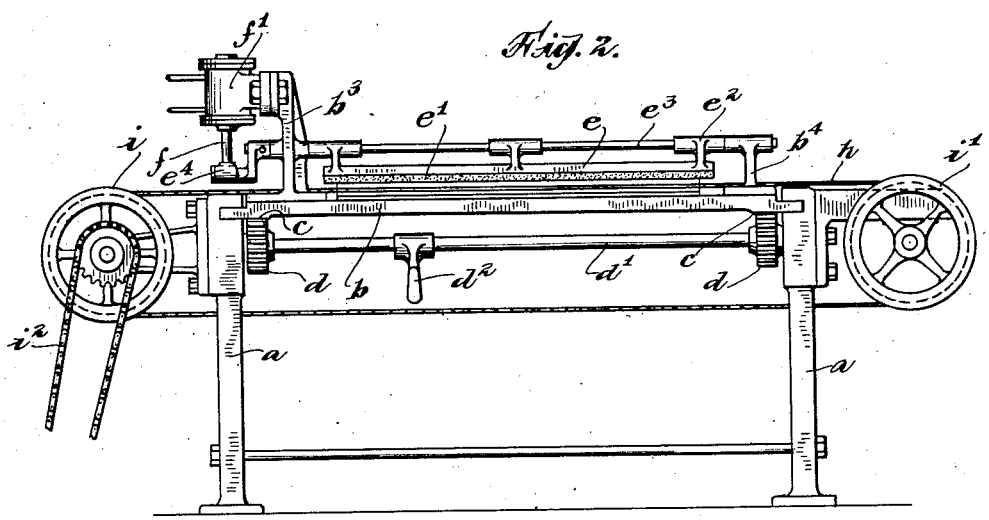
Figure 2 is a view of the same in elevation.
Figure 3:
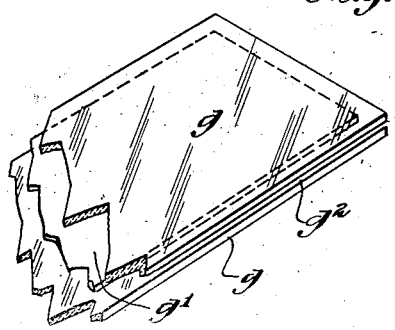
Figure 3 is a view in perspective showing a portion of a sheet of laminated glass with the space at the edge cleaned out.
Figure 4:
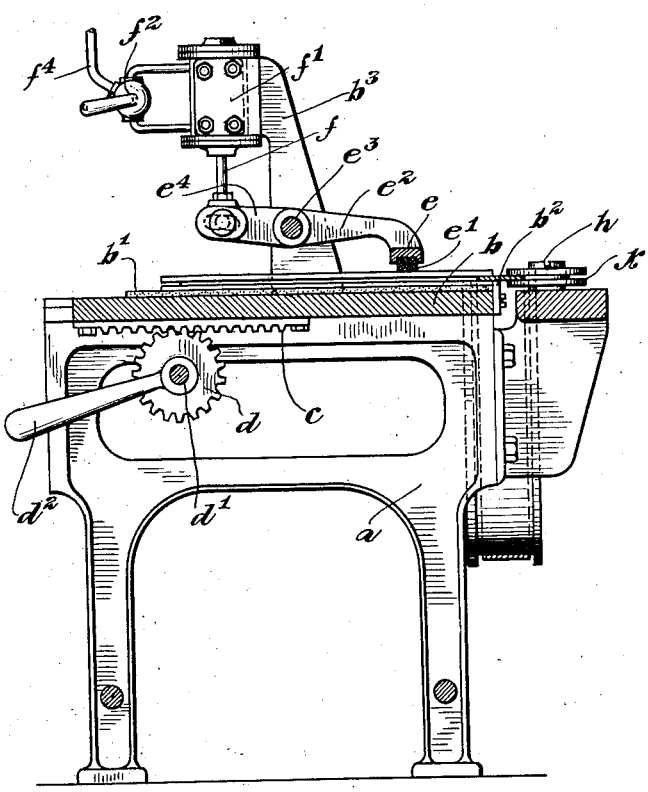
Figure 4 is a view in section on the plane indicated by the broken line 4—4 of Figure 1, but on a somewhat larger scale.

The glass to be operated upon, as shown in somewhat exaggerated form in Figure 3, consists of two sheets $g$ of glass and an interposed sheet $g^1$ of celluloid to which the glass is caused to adhere strongly. For the purpose of sealing the edge of the laminated sheet a thin, narrow space $g^2$, no more than a few hundredths of an inch in thickness, and perhaps one-quarter of an inch in width, is cleaned of all celluloid and any adhesives which may be used all about the edge of the laminated sheet.

The cleaning of the space at the edge of the glass is accomplished by an endless band scraper $h$, preferably serrated at its forward edge and supported at each end by band wheels $i$ and $i^1$, to one of which power may be applied, as indicated at $i^2$, while the other is adjustably mounted on the frame of the machine, as indicated at $i^3$, in order that the band may be maintained under proper tension. Grooved wheels $k$ mounted on a bar $k^1$, serve to support and guide the band so that it shall be maintained in proper position.

In the operation of the apparatus the sheet of laminated glass is laid upon the table $b$ upon which it is held by the presser mechanism which is itself mounted upon the table, as by standards $b^3$, $b^4$, and is advanced toward the band cleaner, which, having been set in motion, enters between the two sheets of glass and cleans out the space to the required width.

I claim as my invention:

An apparatus for use in preparing the edges of laminated glass for sealing comprising an endless, traveling band cleaner, means to support the band cleaner, a movable supporting table to receive the sheet of laminated glass, a presser mounted on the table to press the glass down on the table, means to actuate the same mounted on the table, and means to move the table and the presser toward the band cleaner.

This specification signed this 15th day of August A. D. 1928.

GEORGE W. KRETZSCHMAR.